United States Patent [19]

Brown et al.

[11] Patent Number: 5,371,742
[45] Date of Patent: Dec. 6, 1994

[54] TABLE DRIVEN FAULT RECOVERY SYSTEM WITH REDUNDANCY AND PRIORITY HANDLING

[75] Inventors: Arthur H. Brown; Ronnie E. Dean, both of Aurora, Ill.

[73] Assignee: AT&T Corp., Murray Hill, N.J.

[21] Appl. No.: 929,077

[22] Filed: Aug. 12, 1992

[51] Int. Cl.⁵ .............................. G06F 11/32
[52] U.S. Cl. ...................... 371/7; 371/29.1; 364/241.4; 364/280.8
[58] Field of Search ............ 371/7, 6, 16.5, 29.1; 395/575; 364/241.2, 241.4, 241.5, 241.6, 280.8

[56] References Cited

U.S. PATENT DOCUMENTS

| | | | |
|---|---|---|---|
| 4,103,327 | 7/1978 | Dimmick | 364/200 |
| 4,485,440 | 11/1984 | Duff et al. | 364/300 |
| 4,761,732 | 8/1988 | Eldumiati et al. | 364/200 |
| 4,967,344 | 10/1990 | Scavezze et al. | 364/200 |

Primary Examiner—Vincent P. Canney
Attorney, Agent, or Firm—Charles L. Warren

[57] ABSTRACT

A hierarchal organization of registers containing error indicators is utilized to determine which of a plurality of error recovery modules is to be executed. A redundancy mask and a priority mask stored in a data table associated with each register are sequentially applied to each register in order to eliminate redundant error indicators resulting from a common fault and to set the order of execution of error recovery modules. Thus, the redundancy and priorities associated with detected errors can be controlled substantially independent of the actual error recovery actions to be taken.

21 Claims, 4 Drawing Sheets

| | PRIORITY MASK | | | | | | REDUNDANCY MASK | | | | | NEXT ADDRESS VECTOR |
|---|---|---|---|---|---|---|---|---|---|---|---|---|
| | a | b | c | d | ... | n | a | b | c | d | ... | n | |
| SB(a) | 0 | 0 | 1 | 1 | ... | 0 | 0 | 0 | 0 | 0 | ... | 1 | TA |
| SB(b) | 0 | 0 | 0 | 1 | ... | 0 | 0 | 0 | 0 | 0 | ... | 0 | TB |
| SB(c) | 0 | 0 | 0 | 0 | ... | 0 | 0 | 1 | 0 | 0 | ... | 0 | TC |
| SB(d) | 0 | 0 | 1 | 0 | ... | 0 | 0 | 0 | 0 | 0 | ... | 0 | TD |
| ⋮ | | | | | | | | | | | | | |
| SB(n) | 0 | 0 | 0 | 0 | ... | 0 | 0 | 0 | 0 | 0 | ... | 0 | TN |

*FIG. 3*

TABLE DRIVEN FAULT RECOVERY SYSTEM WITH REDUNDANCY AND PRIORITY HANDLING

BACKGROUND OF THE INVENTION

This invention is directed generally to the handling of errors or faults in a computer system operating under the control of a software program. More specifically, this invention addresses how different error recovery actions are selected especially when multiple concurrent faults are detected.

Error handling methods in a microprocessor environment normally utilize the interrupt vectors supported by the microprocessor. Upon receipt of an interrupt vector associated with detection of a fault, the microprocessor interrupts the currently executing program and executes an alternative program corresponding to the interrupt vector. Faults can be detected by known software and hardware detection techniques. In a typical error handling method, the type and source of the fault determine the error handling process to be executed by selecting the address associated with the desired error handling routine.

Error handling techniques are important in large complex systems which operate under software control since hardware devices and different programs are being concurrently utilized. Error handling and recovery techniques become critical in systems where uninterruptible service must be provided such as in a telecommunications switch environment. In a known recovery technique used in complex systems, error recovery routines and a selection routine that controls which recovery routine to execute have been combined into a sequential coded, integral, error handling system. Such a technique performs best when faults occur sequentially so that only a single fault has to be dealt with at a time. However, in complex systems concurrent faults occur and error handling priorities must be assigned to resolve the order in which the errors are addressed. When a change is needed in the order in which concurrent errors are to be handled, the priorities must be amended. The sequential coded, integral, error handling systems must be carefully reviewed and tested to insure that changes to the order of handling errors have not introduced an error condition in the error handling system itself. Unneeded error handling routines are often executed where the execution of one concurrent error is sufficient to eliminate a fault which gave rise to other concurrent errors.

There exists a need for an improved error handling system that allows changes to be made in the order of handling concurrent errors with a minimum of testing. A need also exists for an error handling system which allows an error to be ignored where the handling of another concurrent error is sufficient to address the fault associated with the ignored error.

Summary of the Invention

It is an object of the present invention to provide an error recovery method and apparatus which address the above needs.

In accordance with an embodiment of the present invention, a plurality of registers are arranged in a hierarchal relationship and contain error indicators generated by a plurality of devices and processes. A data table associated with each register contains supervisory data for each position in the register. Preferably, each supervisory data entry includes a redundancy mask, a priority mask, and an address vector that addresses another register or error recovery module. The redundancy mask acts as a filter that cancels a concurrent error indicator(s) in view of other recovery action to be taken by another concurrently set error indicator. The redundancy mask eliminates the execution of unnecessary recovery actions where a single fault leads to the generation of a plurality of concurrent error indicators. The priority mask determines the order in which nonredundant concurrent error indicators are to be processed.

Error redundancies and priorities can be established and changed substantially independent of the actual error recovery actions utilized to overcome the detected faults. This technique leads to improved error handling efficiencies especially where changes in redundancy or priorities must be made.

Brief Description of the Drawings

FIG. 3 illustrates a data table associated with register SB shown in FIG. 2.

Detailed Description

Figure 1:
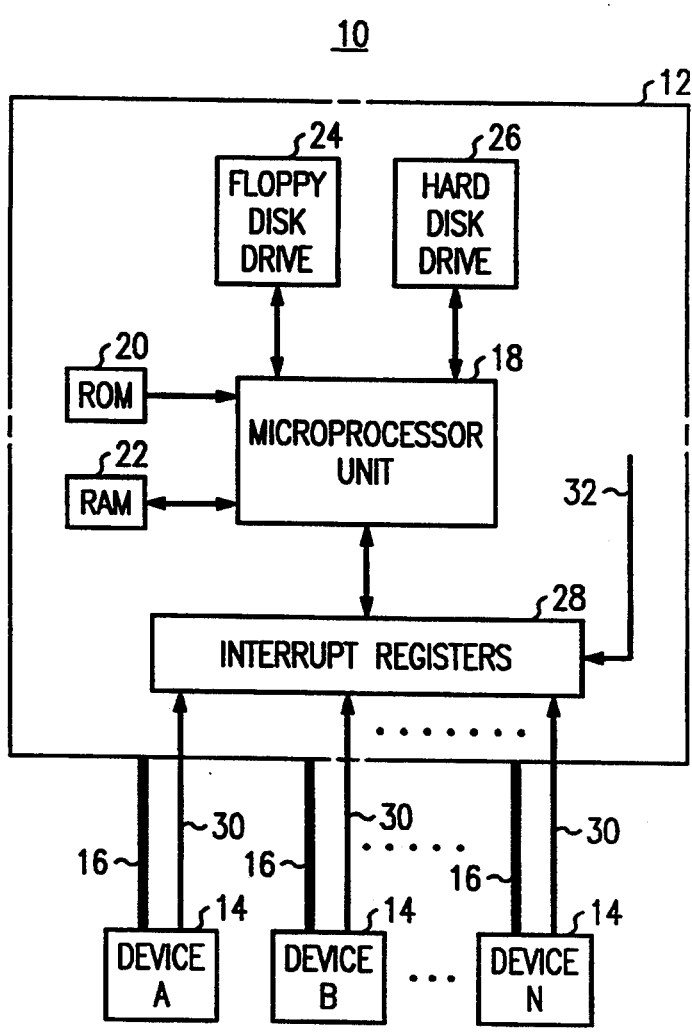
FIG. 1 is a block diagram of a computer controlled system which incorporates an embodiment of the present invention.

FIG. 1 illustrates a software controlled system 10 which incorporates an embodiment of the present invention. System 10 includes a central control device 12 and a plurality of peripheral devices 14 which communicate with device 12 by communication channels 16 which may comprise address and data buses or other known communication methods. Illustrative device 12 includes a microprocessor (MPU) 18, read-only memory (ROM) 20, random access memory (RAM) 22, floppy drive 24, hard drive 26, and interrupt registers 28. Each of elements 20–28 communicate with MPU 18 as will be understood by those skilled in the art. Devices 14 communicate detected fault conditions by means of an error signal transmitted to interrupt registers 28 by paths 30. An illustrative path 32 couples error signals generated by internal devices and processes of device 12 to interrupt registers 28. In a typical configuration each significant hardware device and software program will include fault detection utilized to generate an error signal representative of the detected fault.

Figure 2:
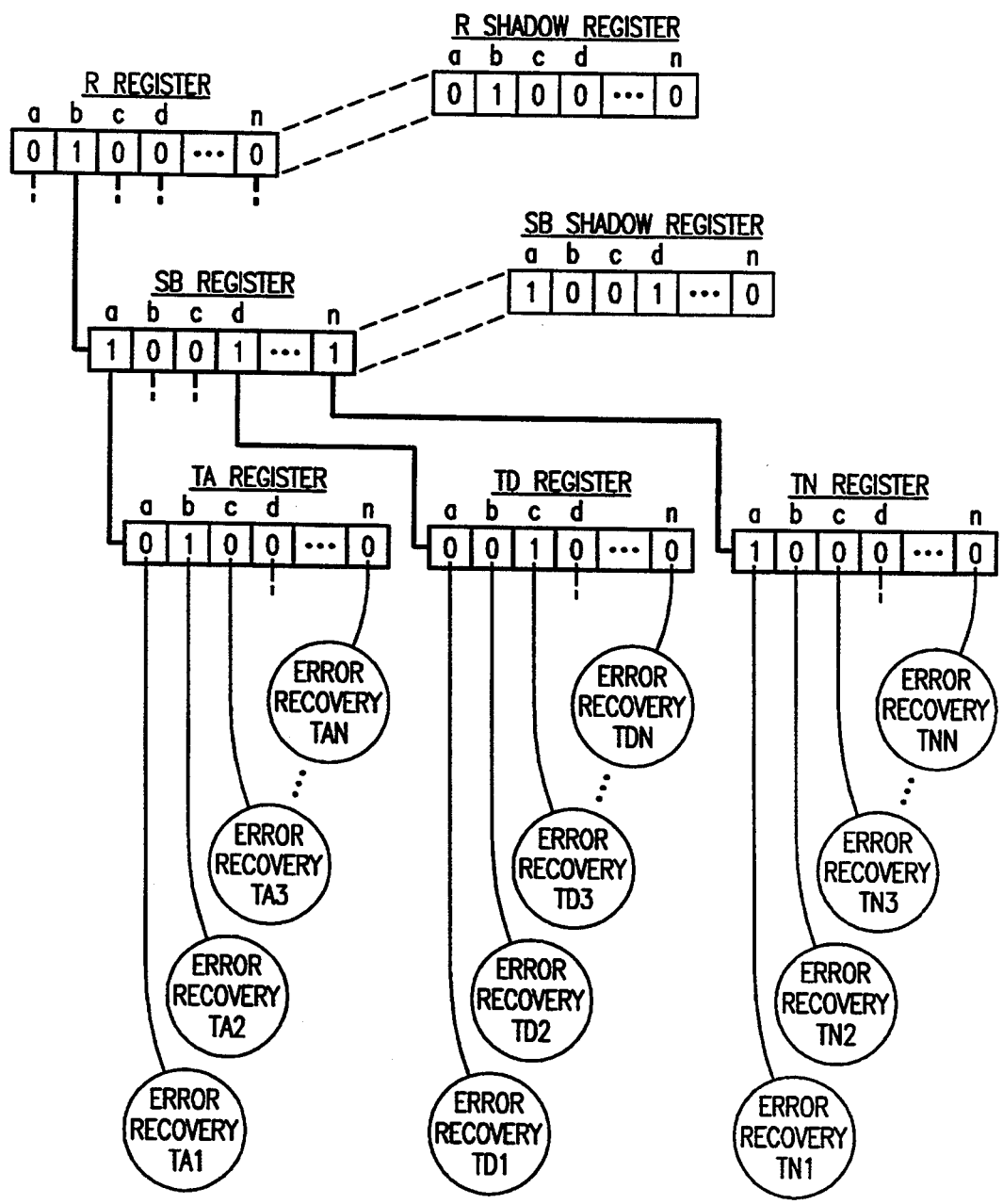
FIG. 2 illustrates the hierarchal relationship of error handling registers and error recovery modules in accordance with an embodiment of the present invention.

FIG. 2 illustrates an exemplary embodiment of interrupt registers 28 arranged in a hierarchal relationship. Register R which is capable of storing bits a–n represents the top register in the illustrated arrangement. Each bit in register R is coupled to either a lower level register or an error recovery module which represents a series of steps (actions) to be implemented by MPU 18 in an attempt to clear or overcome a detected fault. In the illustrative embodiment, register SB is associated with bit b of register R; other registers (not shown) are similarly associated with the other bits of register R and together with register SB comprise the S register set. Sets of registers T (TA, TB, . . . TN) represent the lowest set of registers, each register in the T register set is associated with a bit of a corresponding register S. Illustrated registers TA, TD, and TN are associated with bits a, d and n of register SB. Associated with each of the bits in the T registers is a corresponding error recovery module as indicated; error recovery modules TA1, TA2, TA3 ... TAN are associated with bits a, b, c ... n of register TA, respectively, and similarly for module set TD and TN relative to registers TD and TN. A shadow register is preferably associated with each of the registers; in the illustrative example shadow registers are shown for registers R and SB but are not shown for the registers T. The shadow registers are capable of storing at least the same number of bits associated with each corresponding register and are used in conjunction with the redundancy and priority masking described below.

In registers T, each bit identifies whether or not an error indicator corresponding to an error recovery module is set; a logic "1" indicates the error indicator is set, a logic "0" indicates the error indicator is not set. The bits in registers T are set, upon receipt of error signals which indicate faults as detected by corresponding devices or processes. The bits in the higher level registers S and R indicate whether or not any lower level error indicators in the associated hierarchy have been set. In the illustrative example, bits a, d, and n in register SB are set since at least one bit in corresponding registers TA, TD, and TN are set. Similarly, bit b in register R is set since one or more bits in register SB, are set. The hierarchy of registers operate such that a bit becoming set in a lower level register propagates upwardly through the organization. The highest level register is coupled to MPU 18 and controls the initiation of microprocessor interrupts to handle a detected fault condition.

FIG. 3 illustrates an exemplary data table associated with register SB. A similar data table exists for each of the registers of FIG. 2. Data table rows SB(a)–SB(n) contain data corresponding to bits a–n, respectively, of register SB. A priority mask column and redundancy mask column each contain supervisory data bits a–n. A next address vector column is associated with each row and contains a vector which points to the next associated subordinate register routine or an associated error recovery module. The information contained in the table is predetermined and entered in accordance with the error handling design for the system. The purpose of the redundancy mask is to provide the capability to cancel or mask a set error indicator in the same register as another concurrently set error indicator. Such redundancy masking eliminates unnecessary error recovery steps where it has been predetermined that the occurrence of a particular error indicator(s) concurrently with another error indicator can best be handled by not executing one or more error recovery modules, such as where a common fault source gives rise to multiple fault detections. The purpose of the priority mask is to determine the order in which multiple, nonredundant, error indicators in the same register are to be handled. After a determination has been made as to which set error indicator is to be handled first, its associated next address vector is executed. After one lower level register T has been cleared by execution of error recovery modules corresponding to set indicators, control returns to the register SB. The nonredundant error indicator in register SB with the highest priority then causes recovery execution to continue as directed by the associated next address vector. This process continues until all error indicators in the register have been cleared upon which control passes to the next higher level register. Thus, all zero bits in the highest level register indicates that all lower level registers have been cleared and error recovery module processes executed.

Figure 4:
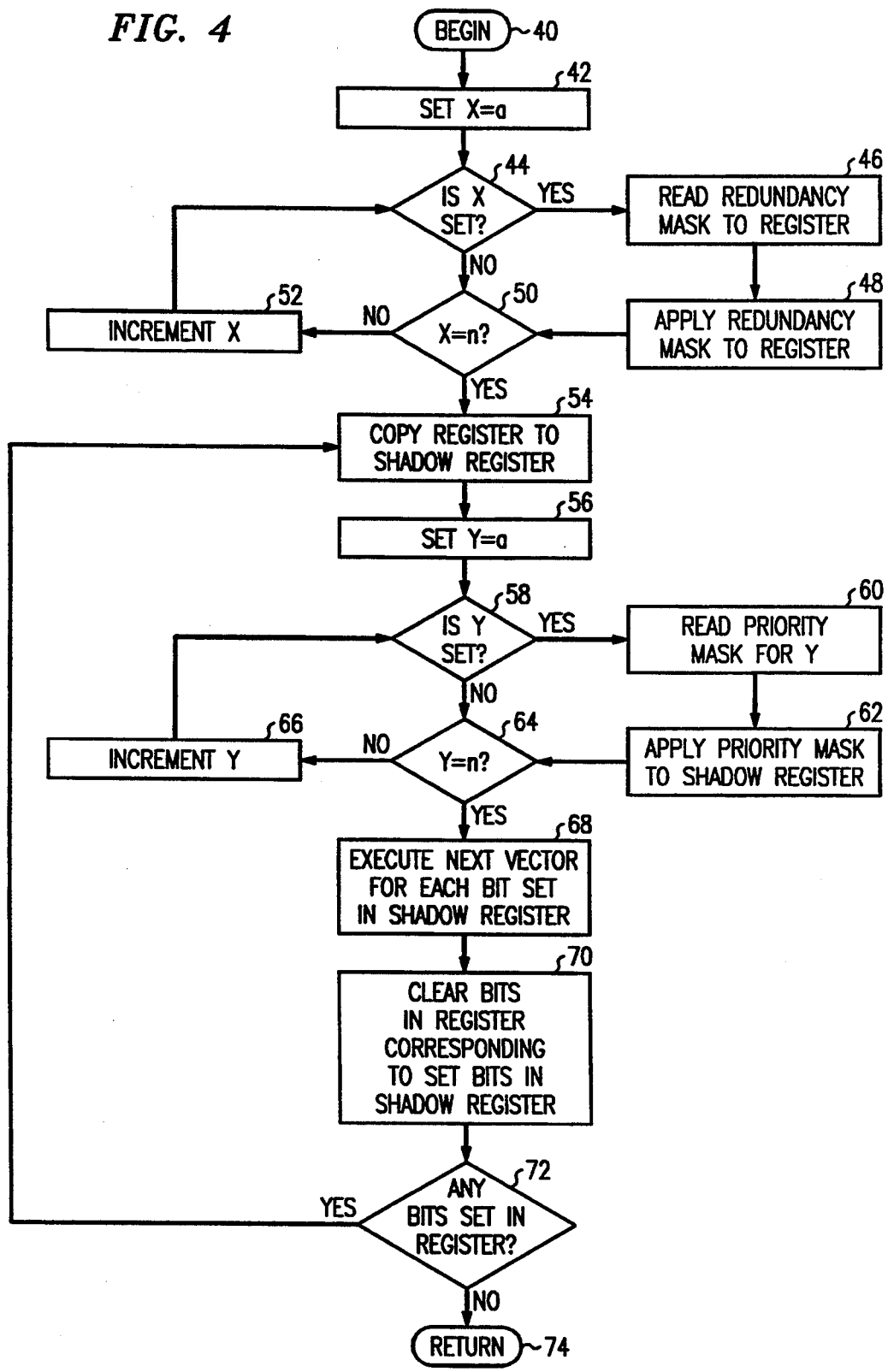
FIG. 4 is a flow diagram of steps in accordance with an embodiment of the present invention illustrating use of the redundancy and priority masks shown in FIG. 3.

FIG. 4 is a flow diagram of error recovery steps in accordance with an embodiment of the present invention. These steps are preferably implemented in software associated with MPU 18 and are executed for each of the registers upon the MPU receiving an initial error recovery interrupt. The redundancy processing starts with BEGIN 40 where variable X is set to the state of bit a of the register being processed. A specific illustrative example will be described below with regard to register SB. In step 44 a determination is made if X is set, i.e. if X=1. Upon a YES determination, the redundancy mask stored in the table for the corresponding bit is read in step 46. The read redundancy mask is applied to the contents of the register being processed. The redundancy mask associated with each set bit of a register is applied by applying bits a–n of the redundancy mask to corresponding bits a–n in the register. A "0" bit in the redundancy mask indicates no change of state is to be made to the corresponding bit in the register; a "1" bit in the redundancy mask causes the corresponding bit in the register to change to a "0" state if it was previously in a "1" state. Thus, logic 1 bits in the redundancy mask reset any corresponding bits in the register. In step 50 a determination is made if variable X has been set to the state of bit n, i.e. has each bit in the subject register been tested by step 44? Upon a NO determination, variable X is incremented in step 52 by setting X equal to the state of the next bit, i.e. set X=state of b if it was previously set to the state of a. Control is then returned to step 44 which processes each set bit in accordance with steps 46 and 48. A NO determination by step 44 which indicates the corresponding bit is not set, results in control passing directly to step 50 thereby bypassing steps 46 and 48. A YES determination by step 50 indicates that each of the bits in the register has been processed; control then passes to another part of this method. Therefore, a corresponding redundancy mask for each of the set bits in a register is applied to the contents of the register.

The priority processing starts with step 54 where the contents of the register being processed by the method is copied to its corresponding shadow register. It should be noted that the register contents are copied following the application of the redundancy mask so that the contents of the shadow register may not be identical to the original contents of its associated register. In step 56 variable Y is set equal to the state of bit a of the corresponding shadow register. In step 58 a determination is made as to whether Y is set. Upon a YES determination, the priority mask for bit Y is read in step 60. The priority mask is applied to the data in the shadow register in step 62. The priority mask corresponding to each set bit in the shadow register is applied to the contents of the shadow register by comparing the priority mask bits a . . . n to the corresponding bits a . . . n of the shadow register. A logic 1 in a bit in the priority mask causes the corresponding bit in the shadow register to be reset, if set; a "0" in a bit in the priority mask has no effect on the state of the corresponding bit in the shadow register. In step 64 a determination is made if variable Y has been loaded with the state of bit n, i.e. have all the bits in the shadow register been tested by step 64? Upon a NO determination, Y is incremented to be set to the state of the next bit by step 66 and control passed to step 58. Thus, for each set bit in the shadow register, a corresponding priority mask is applied potentially causing certain of the bits set in the shadow register to be reset thereby giving priority of execution order to the indicators (bits) remaining set in the shadow register.

A YES determination in step 64 indicates that each of the set bits in the shadow register have had a corresponding priority mask applied to the contents of the shadow register. Thus, error indicators now contained in the shadow register have been modified to implement redundancy and priority in accordance with predetermined corresponding criteria determined by the table. In step 68 the next address vector is executed for each bit set in the shadow register. If the vector is to a subordinate register, a series of steps similar to that shown in FIG. 4 will be applied to the subordinate register in accordance with data contained in the subordinate register and its corresponding table. Should more than one bit be set in the shadow register following the redundancy and priority routines, the corresponding vectors will be executed in a predetermined manner such as a top-to-bottom order as viewed in the table. Step 68 acts as a "call" function to call either subordinate registers or error recovery modules, each of which will return control following execution to step 70. In step 70, bits in the register are cleared which correspond to set bits in the shadow register. That is, bits in the register which correspond to bits in the shadow register that have been executed by step 68 are cleared in preparation for further prioritization. In step 72 a determination is made if any bits remain set in the register. A YES determination causes control to return to step 54 wherein the modified contents of the register are copied to the shadow register with prioritization again determined by steps 54-66. A NO determination by step 72 indicates that all bits have been processed and hence, these steps end at RETURN 74. This permits control to be passed to a similar program associated with a superior register, i.e. a register higher in the hierarchy.

The following example of processing in accordance with the present invention utilizes the states and data shown in FIGS. 2 and 3. In the illustrative example, three concurrent faults have been identified by corresponding error signals as indicated by registers TA(b), TD(c) and TN(a). The logic 1s associated with each are rippled upward in the hierarchy to bits a, d, and n of register SB, which in turn causes a logic 1 in register R(b). The example illustrates processing of register SB. It should be noted that the processing of register R in this example represents a relatively trivial case in which no redundancy or conflict of priority exists since only one error indicator is set. The processing in accordance with the present invention begins with the highest level register and proceeds down in the hierarchy until each set error indicator has been addressed.

Register SB is processed by applying the redundancy and priority masks shown in FIG. 3 in accordance with the steps shown in FIG. 4. Since only bits a, d, and n are initially set in register SB, only the corresponding redundancy masks SB(a), SB(d), and SB(n) can be considered for application in accordance with steps 42-52. For SB register bit a, the SB(a) redundancy mask indicates a redundancy only for bit n. Thus applying the SB(a) redundancy mask causes bit n of register SB to be reset from 1 to 0. Application of the SB(d) redundancy mask results in no change since the redundancy mask indicates no corresponding redundancies, i.e. all bits have a 0 state in the mask. The SB(n) redundancy mask is not applied since the earlier SB(a) redundancy mask application caused bit n in the SB register to be reset to 0. Thus upon application of step 54 to register SB, the SB shadow register bits will have the states as shown in FIG. 2 based upon application of the redundancy masks as shown in FIG. 3 to the original states of register SB.

Steps 56-66 apply the priority masks of FIG. 3 to the contents of the SB shadow register as shown in FIG. 2 in which only bits a and d are set. Thus, only the priority masks for SB(a) and SB(d) can be considered for application to the contents of the SB shadow register. Only bits c and d in the SB(a) priority mask are set thereby indicating that the error recovery module associated with bit a should be executed prior to the execution of error recovery modules associated with either bits c or d. Since bit d is set in the illustrated example, application of the SB(a) priority mask to the SB shadow register will cause bit d to be reset to 0. Thus, priority mask for SB(d) which would have been executed if shadow register bit d had remained set, will not be executed in view of bit d having been reset due to the application of priority mask SB(a). Therefore, upon entering step 68 only SB shadow register bit a will be set causing execution to transfer to the next address vector TA associated with SB(a). Since only bit b in register TA is set, the redundancy and prioritization in accordance with the steps of FIG. 4 associated with register TA are trivial resulting in the application of error recovery module TA2. Following the execution of module TA2, return passes to step 70 in the program associated with register TA wherein bit b is reset. Since no bits remain set in register TA, control then returns to the program associated with register SB at step 70 as shown in FIG. 4. In accordance with step 70, only bit a of the SB shadow register is set and hence, register SB bit a is reset, thereby leaving only bit d being set in register SB (it will be remembered that originally set bit n in register SB was reset in accordance with the redundancy mask earlier). In step 72 a YES determination is made in view of bit d being set and return passes to step 54 which recopies the current status of register SB to the SB shadow register wherein the SB shadow register has only bit d set. Since only one bit is set, the prioritization mask execution is trivial and results in step 68 passing control to register TD pursuant to the next address vector of SB(d). Since only bit c of register TD is set, the redundancy and prioritization program associated with register TD will cause the execution of error recovery module TD3, resetting of bit c in register TD, and return of control to the program associated with register SB at step 70. The remaining set bit d in register SB is reset according to step 70 thereby causing a NO determination in step 72. Control passes back to the program associated with register R. Since all bits in register SB will have been cleared to 0, the bit b in register R is reset to 0.

Because the redundancy and priority masks are independently controllable relative to the error recovery actions, it is easy to make changes to the redundancy between concurrently detected faults and establish different priorities for the order of execution of error recovery modules. This minimizes the need for additional testing of the fault recovery system to verify that the system will operate properly following the change.

It will be apparent to those skilled in the art that the fault recovery system in accordance with the present invention could be implemented utilizing only the priority mask or the redundancy mask. However, it is believed that the combination of both the redundancy and priority masks provides increased control while maintaining flexibility for later changes in controlling the fault recovery system. It will also be understood that the illustrative registers and shadow registers can be implemented as defined memory locations in a RAM as well as in conventional registers.

Although an embodiment of the present invention has been described herein and shown in the drawings, the scope of the invention is defined by the claims which follow.

We claim:

1. A fault recovery arrangement for use in a computer controlled system, said arrangement receiving error signals corresponding to the detection of faults, the arrangement comprising:
   register means for storing indicators corresponding to the receipt of said error signals;
   table means for storing predetermined supervisory data corresponding to said indicators;
   means operating under the control of a program for applying said supervisory data to said indicators stored in the register means to select ones of said indicators; and
   means operating under the control of a program for executing predetermined error recovery actions corresponding to said selected indicators.

2. The arrangement according to claim 1 wherein said table means stores one group of supervisory data that defines which, if any, set indicators are redundant to other concurrently set indicators, said set indicators corresponding to associated error signals being received.

3. The arrangement according to claim 2 wherein said applying means applies said one group of supervisory data to said indicators to mask redundant indicators, said masked indicators not being selected to initiate corresponding error recovery actions.

4. The arrangement according to claim 1 wherein said table means stores one group of supervisory data that defines the priority of said indicators and hence the order of execution of the corresponding error recovery actions.

5. The arrangement according to claim 1 wherein said table means stores first and second groups of supervisory data that define the redundancy, if any, of said indicators and the relative priority of said indicators, respectively.

6. The arrangement according to claim 5 wherein said applying means applies said first group of supervisory data to said indicators to eliminate any redundant indicators as determined by said first group of data and then applies said second group of supervisory data to said indicators to determine the order of execution of associated error recovery actions.

7. The arrangement according to claim 1 wherein said register means comprises a lower group of memory storage registers and a higher memory storage register coupled to said lower group of registers, each memory storage register in said lower set being associated with an indicator in said higher memory storage register.

8. The arrangement according to claim 7 wherein each memory storage register in said lower group includes a plurality of said indicators, at least one of the indicators in a lower group register representing receipt of an error signal, said at least one indicator being required for the corresponding indicator in said higher memory storage register to indicate receipt of an error signal.

9. The arrangement according to claim 7 wherein each indicator in the memory storage registers of said lower group is associated with one of said predetermined error recovery actions.

10. The arrangement according to claim 7 further comprising another lower group of memory storage registers and another higher memory storage register associated with said lower group of memory storage registers and higher memory storage register, respectively, said another set of memory storage registers and another higher memory storage register being utilized by said applying means to store modified indicators created by applying said supervisory data to the indicators stored in corresponding registers.

11. The arrangement according to claim 1 wherein said table means stores a next address vector for each of said indicators, said vector identifying a next register means associated with each indicator.

12. A fault recovery method for use in a computer controlled system which receives error signals corresponding to the detection of faults, the method comprising the steps of:
   storing indicators corresponding to the receipt of said error signals;
   storing predetermined supervisory data corresponding to said indicators:
   applying said supervisory data to said stored indicators to create a shadow set of indicators;
   executing predetermined error recovery actions corresponding to said shadow set of indicators.

13. The method according to claim 12 wherein said storing step further comprises the step of storing one group of supervisory data that defines which, if any, of said indicators are redundant to other concurrent indicators, said applying step applying said one group of supervisory data to said stored indicators to modify the state of redundant indicators so that error recovery actions corresponding to said redundant indicators are not executed.

14. The method according to claim 12 wherein said storing step further comprises the step of storing one group of supervisory data defining the relative priority of said indicators and hence defining the order of execution of said corresponding predetermined error recovery actions.

15. The method according to claim 12 wherein said storing step further comprises the step of storing first and second groups of supervisory data that define the redundancy, if any, of said indicators and the relative priority of said indicators, respectively.

16. The method according to claim 15 wherein said step of applying applies said first group of supervisory data to said indicators to eliminate redundant indicators as determined by said first group of data and then applies said second group of supervisory data to said indicators to determine the order of execution of associated error recovery actions corresponding to said indicators.

17. The method according to claim 12 further comprising the steps of determining which, if any, of said indicators are redundant to other indicators, said shadow set of indicators not including redundant indicators, determining the relative priority of said shadow indicators, and executing the predetermined error recovery actions corresponding to the prioritized shadow indicators.

18. A hierarchal fault recovery arrangement for use in a computer controlled system which receives error signals corresponding the detection of faults, the arrangement comprising:
- a plurality of memory storage elements arranged in a hierarchal organization, each element storing indicators which indicate if a corresponding error signal has been received;
- a data table stores predetermined supervisory data corresponding to said indicators;
- means for creating a modified set of indicators by mathematical application of a group of supervisory data to a corresponding group of indicators;
- means for selecting an error recovery action based on said modified indicators to be executed from a group of error recovery actions.

19. The arrangement according to claim 18 wherein said creating means comprises means for eliminating certain concurrent indicators which are redundant to other concurrent indicators thereby inhibiting the execution of error recovery actions associated with said certain indicators.

20. The arrangement according to claim 18 wherein said creating means comprises means for establishing an order of execution of a plurality of error recovery actions based on a prioritization of indicators within one hierarchal level.

21. The arrangement according to claim 19 wherein said creating means further comprises means for prioritizing said other indicators so that an order of execution of corresponding error recovery actions is established.

* * * * *